(12) United States Patent
Danieli (10) Patent No.: US 7,437,290 B2
(45) Date of Patent: Oct. 14, 2008

(54) AUTOMATIC CENSORSHIP OF AUDIO DATA FOR BROADCAST

(75) Inventor: Damon V. Danieli, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 10/976,116

(22) Filed: Oct. 28, 2004

(65) Prior Publication Data

US 2006/0095262 A1   May 4, 2006

(51) Int. Cl.
*G10L 15/04* (2006.01)
*G10L 15/00* (2006.01)

(52) U.S. Cl. .................... 704/251; 704/252; 704/255

(58) Field of Classification Search .................... None
See application file for complete search history.

(56) References Cited

U.S. PATENT DOCUMENTS 6,337,947 B1 *  1/2002  Porter et al. ................. 386/55

7,139,031 B1 * 11/2006  Bray ........................... 348/468

OTHER PUBLICATIONS

Seide et al ("Vocabulary-Independent Search in Spontaneous Speech", IEEE International Conference on ASSP, May 2004).*

* cited by examiner

*Primary Examiner*—David R. Hudspeth
*Assistant Examiner*—Samuel G Neway
(74) *Attorney, Agent, or Firm*—Workman Nydegger (57) ABSTRACT

An input audio data stream comprising speech is processed by an automatic censoring filter in either a real-time mode, or a batch mode, producing censored speech that has been altered so that undesired words or phrases are either unintelligible or inaudible. The automatic censoring filter employs a lattice comprising either phonemes and/or words derived from phonemes for comparison against corresponding phonemes or words included in undesired speech data. If the probability that a phoneme or word in the input audio data stream matches a corresponding phoneme or word in the undesired speech data is greater than a probability threshold, the input audio data stream is altered so that the undesired word or a phrase comprising a plurality of such words is unintelligible or inaudible. The censored speech can either be stored or made available to an audience in real-time.

19 Claims, 8 Drawing Sheets

AUTOMATIC CENSORSHIP OF AUDIO DATA FOR BROADCAST

FIELD OF THE INVENTION

This invention generally pertains to a system and method for automatically altering audio data that include undesired words or phrases, and more specifically, to a system and method for automatically altering the audio data either as stored or that are being conveyed over a network in real-time, to prevent undesired words and phrases in the audio data from being understandable to a listener as originally uttered.

BACKGROUND OF THE INVENTION

It is common for radio and television broadcasts of live events to be delayed a few seconds before the audio data are transmitted to enable the content to be reviewed in real-time by individuals who are tasked with preventing undesirable language from being received. This form of censorship has become more critical with the increased demand for "cleaning up" the airwaves to eliminate obscenities, profanities, sexually specific words and other content deemed unsuitable for general audiences. While the degree of censorship applied to audio content will typically depend upon the nature of the event that is being broadcast and the audience likely to receive the broadcast, it is apparent that certain expletives and words or phrases will be targeted as unacceptable for a given kind of event, likely audience, and even the time at which a broadcast occurs (depending on whether children would likely be included in the audience at that time).

Humans are remarkably adept at identifying words and phrases that are considered unacceptable. However, for certain types of broadcasts, it would be preferable to employ a more automated approach that avoids the need to pay for or provide a human censor to monitor the broadcast, while still enabling the audio data to be censored at an appropriate level. For example, in massive multiplayer games, it would be impractical to employ a human censor to monitor the multitude of voice chat sessions that might be occurring at one time.

Since human censors have the ability to adapt to the venue and to different speakers and language traits so that the content of the speaker's utterance is not unduly censored, it would also be desirable for any automatic censorship system and method to be capable of similarly dynamically adapting to the requirements of a specific venue and likely audience. The need for such variability in the censorship process should be apparent. For example, an automatic censor system should apply a much more relaxed level of censorship during an interview of a sports personality occurring in a late night broadcast that would likely not be heard by children, and the speaker who is a well-known personality would be expected to be more responsible for any inappropriate personal utterances than the network over which those utterances are broadcast. In contrast, for speech by an announcer during a children's game show, the list of words included in the unacceptable vocabulary used by an automatic censor system would likely be much longer and the tolerance for allowing any questionable words or phrases to slip through would be much tighter.

It would also be desirable to enable the automated system to dynamically adjust to frequency with which a speaker uses expletives and other undesired speech, since the recognition of undesired speech may not be entirely accurate. A lower threshold can be applied if the speaker uses undesired speech more frequently, to avoid any undesired speech being transmitted, while if a speaker only infrequently appears to use such undesired speech, it would likely be preferable to apply a higher threshold to avoid mistakenly censoring speech that is not truly undesired. Since two words that sound alike can have different meanings, depending upon context, it is important that an automated censor system and method apply appropriate rules to avoid censoring perfectly acceptable words, while censoring unacceptable words and phrases, depending upon the context of the spoken words or phrases. It would be desirable to apply a probability threshold in making such decisions, so that the decisions made can be controlled by varying the probability threshold appropriately.

Censorship of spoken language can be annoying if each obscenity or profanity is "bleeped" to obscure it so that it is not understood, particularly if the frequency with which such utterances occur is too great. Accordingly, it would be desirable for an automatic censor system and method to employ an alternative approach wherein the undesired speech is simply either replaced with an acceptable word or phrase, or is reduced in volume below audibility, or is deleted from the audio data. While a human censor can prevent an utterance from being broadcast or can overwrite the undesired language with a word or phrase, human censors do not have the capability to produce an acceptable simulated utterance for a given speaker, to overwrite the undesired utterance of that speaker. The best technique for preventing undesired language from being heard and/or understood also will depend on the application and minimizing the adverse impact on the listener. Songs with undesired language will be adversely impacted if that language is bleeped out. A much less minimal impact on the listener's experience can be achieved by simply removing the undesired words or attenuating the volume of the words, but not the music, when such words or phrases are automatically detected.

SUMMARY OF THE INVENTION

There are many applications in which it may be impractical or even undesirable to employ a human to censor audio data, but in which there is still a need to provide some level of censorship to prevent profanities, obscenities, expletives, and sexually explicit language from being heard by an audience. Accordingly, the present invention enables the censorship of audio data to be automatically accomplished, thereby avoiding the need for human censors to be involved. An example of such an application is the audio chat that is enabled for some online games. Either other participants in the online game or spectators who are observing and/or listening to the participants' interaction should not be exposed to such undesired language. Accordingly, one aspect of the present invention is directed to a method for automatically censoring audio data. This method includes the steps of processing the audio data to automatically detect any undesired speech that may be included therein. The audio data are compared to undesired speech data, and each occurrence of undesired speech that is automatically detected is altered, producing censored audio data in which the undesired speech is substantially no longer perceivable by a listening audience.

In one embodiment, the step of automatically processing includes the step of generating a lattice of phonemes or word fragments that are likely included in the audio data. The word fragments are compared against corresponding word fragments that are included in the undesired speech data, to identify potential matches. Based upon a probability of a potential match, relative to a probability threshold, the method automatically determines whether any undesired speech is included in the audio data.

In another embodiment, the step of automatically processing includes the step of comparing words in the audio data against words that are designated as undesired speech, to identify potential matches. Again, based upon a probability of a potential match relative to a probability threshold, the method automatically determines whether any undesired speech is included in the audio data.

One advantage of the present invention is that it can dynamically vary the probability threshold dependent upon at least one criterion. For example, this criterion can include an expected audience for the audio data, an identity of a speaker that uttered the audio data, a time at which the audio data will be heard by an audience, a type of event resulting in the audio data, an application of the audio data, and a frequency with which undesired speech by a specific speaker has previously been detected in the audio data. Also, the probability threshold can be set to different levels for each different word or phrase that is undesired. Thus, a more obscene word or phrase can be assigned a lower probability threshold than a less obscene word or phrase.

The audio data can be altered to make the undesired speech unintelligible or inaudible. For example, any portion of the audio data that is identified as undesired speech can be made inaudible by substantially reducing its volume, or by deleting it from the audio data. Also, undesired speech can be obscured by overwriting with a "bleep" or other obscuring audio signal that prevents the undesired speech from being intelligible. For certain applications, an even better approach is to replace any portions of the audio data that match the undesired speech with related speech that is acceptable. The related speech is produced using phonemes that were previously uttered by a speaker whose undesired speech is being replaced.

Another significant advantage of the present invention is the ability to dynamically adjust the probability threshold based upon a frequency with which undesired speech by a specific speaker is detected in the audio data. Thus, if there is an increase in the occurrence of undesired speech, the probability threshold can be reduced. If the probability threshold is reduced in this manner, although some words in the audio data spoken by that speaker may be incorrectly identified as undesired speech and altered, the reduced probability threshold should ensure that the fewer of the more frequently uttered undesired words or phrases of the speaker are allowed to remain in the censored audio data.

Another aspect of the present invention is directed to memory medium on which are stored machine executable instructions for carrying out the functions of the method discussed above. Still another aspect of the present invention is directed to a system for automatically censoring audio data to prevent undesired speech included therein from being understandable by an audience who may be listening to the audio data. The system includes a memory in which the undesired speech data and machine instructions are stored and which at least temporarily stores the audio data. A processor is coupled to the memory and is able to access the audio data at least temporarily stored therein. The processor executes the machine instructions, causing the processor to carry out a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing the Present Invention

Figure 1:
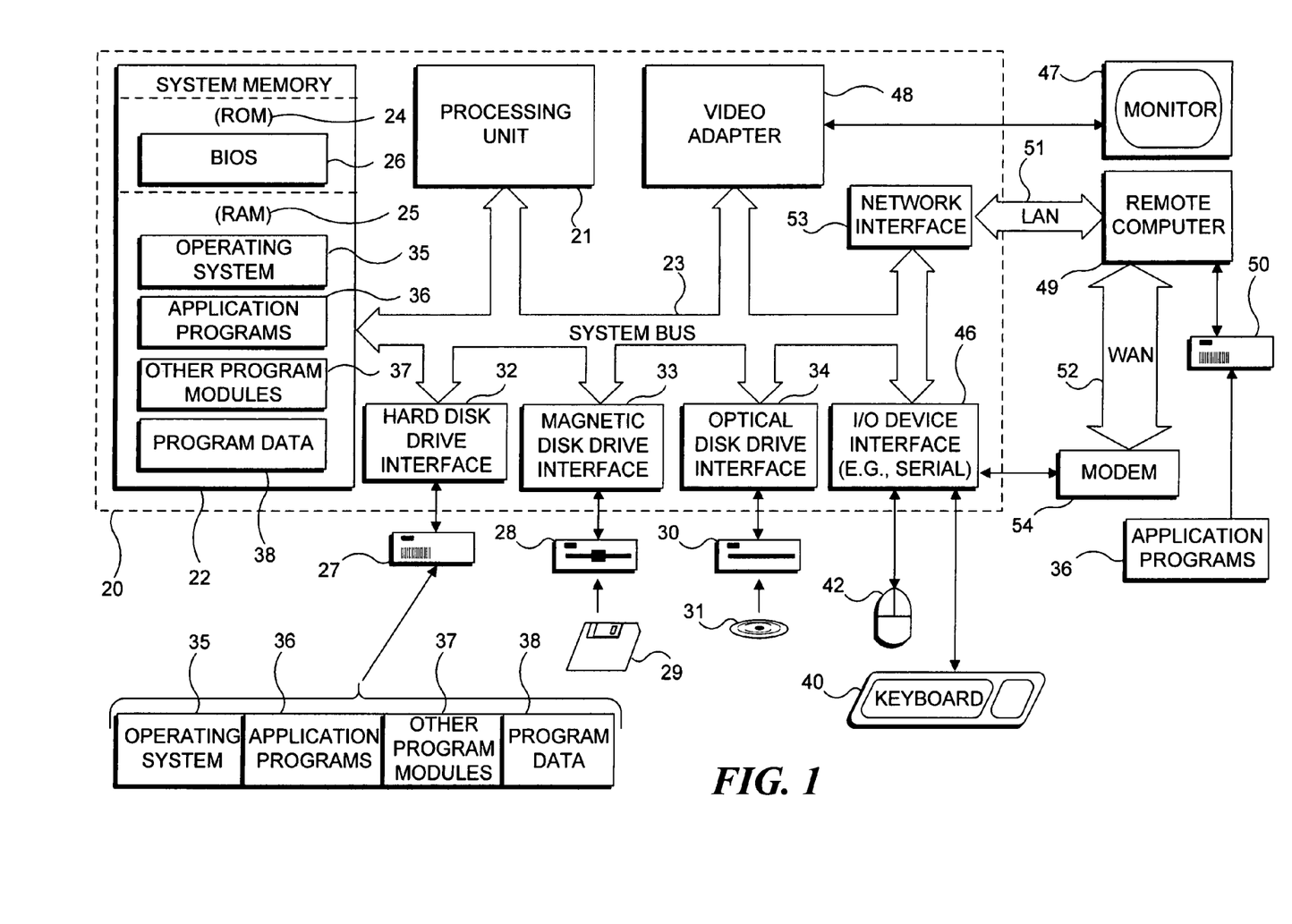
FIG. 1 is a functional block diagram of a generally conventional personal computer (or server) that is suitable for practicing the present invention.

With reference to FIG. 1, an exemplary system suitable for implementing a preferred embodiment of the present invention is shown. The system includes a general purpose computing device in the form of a conventional PC 20 (or server), provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 is connected to system bus 23 via an appropriate interface, such as a video adapter 48. It will be appreciated that PCs are often coupled to other peripheral output devices (not shown), such as speakers (through a sound card or other audio interface—not shown, which can be used by an audience for listening to audio data) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Description of the Present Invention

Figure 2:
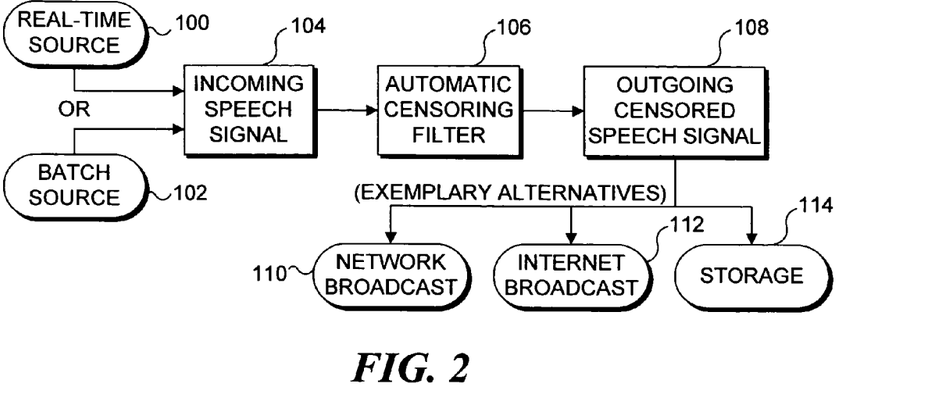
FIG. 2 is a functional block diagram illustrating the functionality of the present invention.

The block diagram of FIG. 2 illustrates the functional components of the present invention. Audio data that are input and processed to provide censored speech can comprise either a real-time source 100, or a batch source 102. Typically, real-time source 100 may, for example, be produced by a speaker participating in a chat session or a person being interviewed, or by speakers on a talk show, or by other speakers. The real-time data are processed at about the time that the speech is uttered by the speaker. In contrast, batch source 102 would typically comprise one or more previously recorded audio files of speech by one or more speakers that is to be censored before being broadcast, stored, or otherwise made available to be heard by an audience. In either case, the speech from real-time source 100 or from batch source 102 is input as an incoming speech signal 104 to an automatic censoring filter 106. Unlike a conventional television network broadcast that is delayed for a few seconds to enable a human censor to prevent profanity and obscene words from being broadcast, automatic censoring filter 106 is implemented by a computing device that produces an output censored speech signal 108 without human intervention. The details of the processing carried out by automatic censoring filter 106, which are explained below, are an aspect of the present invention, since they make possible the automatic censoring of the input speech signal to eliminate undesired speech comprising obscenities, profanities, and sexually explicit language before the speech is broadcast or otherwise made available to an audience.

Figure 3:
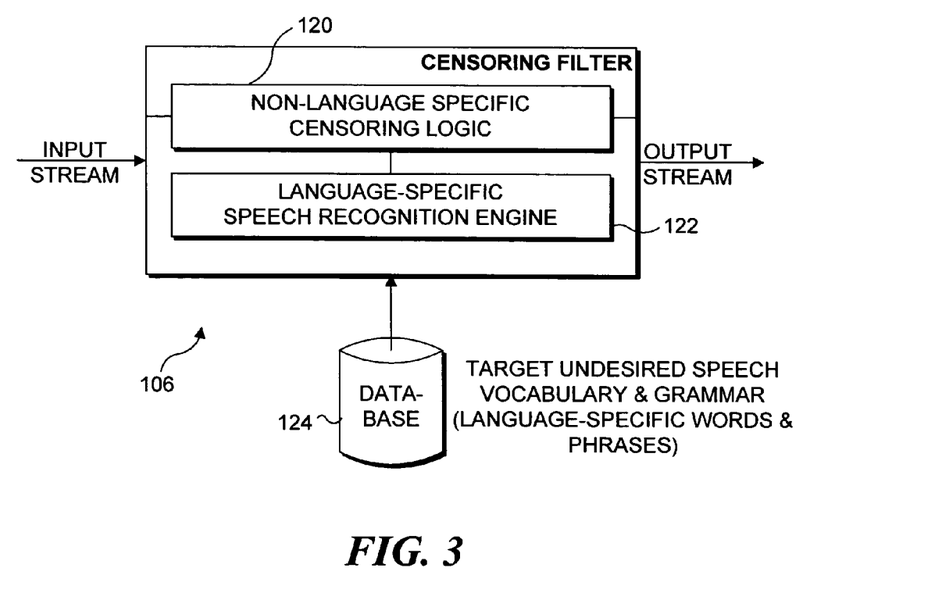
FIG. 3 is a functional block diagram of a censoring filter, generally as employed by an embodiment of the present invention.

Although the undesired speech is not limited to profane words or obscene words or expressions, or to sexually explicit language, in most cases, the undesired speech will indeed comprise such words or phrases. However, the present invention can also be applied to censor other types of words or phrases from spoken audio data, depending entirely upon the target undesired speech data that are employed by automatic censoring filter 106 to produce the output data stream. As shown in FIG. 3, automatic censoring filter 106 is coupled to a database 124 that includes the target undesired speech vocabulary and grammar. As explained in greater detail below, the target undesired speech vocabulary can be stored in database 124 as combinations of phonemes, or alternatively as language specific words and phrases, or the phonemes can be derived from the language-specific words and phrases. An initial embodiment of the present invention was tested using a target database that included language-specific words and phrases that were provided to automatic censoring filter 106, and non-language specific censoring logic 120 was employed with a language-specific speech recognition engine 122 to produce the output stream of censored speech.

Figure 4:
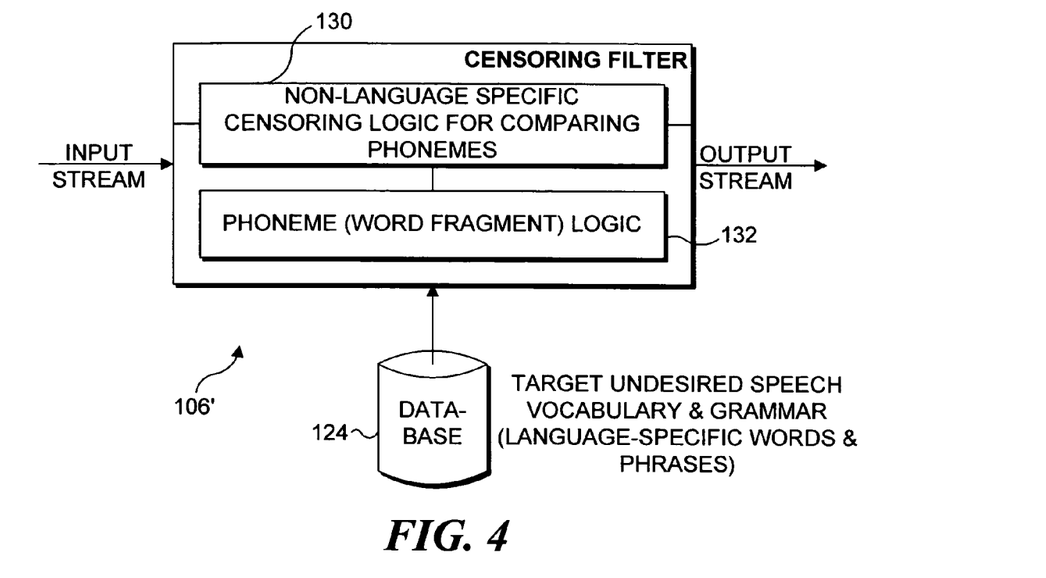
FIG. 4 is a functional block diagram of a censoring filter, generally as employed in an alternative embodiment of the present invention, relative to that of FIG. 3.

Another embodiment of an automatic censoring filter 106' is illustrated in FIG. 4. It is expected that a target database comprising combinations of phonemes corresponding to the words and phrases of the undesired speech should provide a more accurate and robust basis for automatically censoring an input audio data stream of speech. As shown in this Figure, the input audio data stream of speech is processed by a non-language specific censoring logic 130 that compares phonemes in the input stream with phonemes developed from the target undesired speech vocabulary in database 124, using phoneme (word fragment) logic 132. It should be noted that even automatic censoring filter 106 (FIG. 3) also initially reduces the input speech into the phonemes that are processed to determine likely words included in the input speech. In the embodiment of FIG. 3, these words are then subsequently compared to the language-specific words and phrases comprising the target undesired speech.

However, in regard to the embodiment of FIG. 4, since likely language-specific words need not be identified by automatic censoring filter 106', and since the comparison that is made in this embodiment requires far fewer phonemes to specify the undesired words and phrases, a much more efficient and accurate comparison is achieved. This approach is therefore more accurate than that of the embodiment shown in FIG. 3, because the comparison of phonemes is at a more basic level than the comparison of words or phrases, and is less dependent upon selecting the words and phrases likely included in the input audio data, based upon the probabilities that the phonemes detected comprise those words or phrases.

In a manner that is generally consistent with its use in academic literature related to this technology, the term "keyword" and its plural form are used herein to refer to both words and phrases that are undesirable.

Methods for spotting words in an audio stream are well known. These methods consist of those that index the speech in real time (as the audio is coming in), for example as described by D. A. James and S. J. Young in "A fast lattice-based approach to vocabulary-independent wordspotting," Proc. ICASSP'04, Adelaide (1994), or those that create an index offline and then search the index in real time, as described by P. Gelin and C. J. Wellekens in "Keyword spotting enhancement for video soundtrack indexing." Additionally, the methods are separated into those that have an a priori knowledge of the keywords to look for during language model creation (see B. Logan et al., "An experimental study of an audio indexing system for the web," Proc. ICSLP'2000, Beijing, China 2000) and those that are optimized for "in vocabulary" and "out of vocabulary" words, as discussed by F. Seide et al. in their paper entitled, "Vocabulary-independent search in spontaneous speech."

Due to the changing nature of censorship, different words and phrases can be judged to be acceptable or unacceptable depending upon the context and timing of the program. Words that used to be banned from television and radio are now acceptable while new words and slang are entering onto censors lists. Therefore, our wordspotting algorithm uses the vocabulary independent and domain independent techniques in (as per the above-noted paper by F. Seide et al.) as the front end to discover keywords and then a novel and domain dependent action algorithm once those keywords are located.

Figure 5:
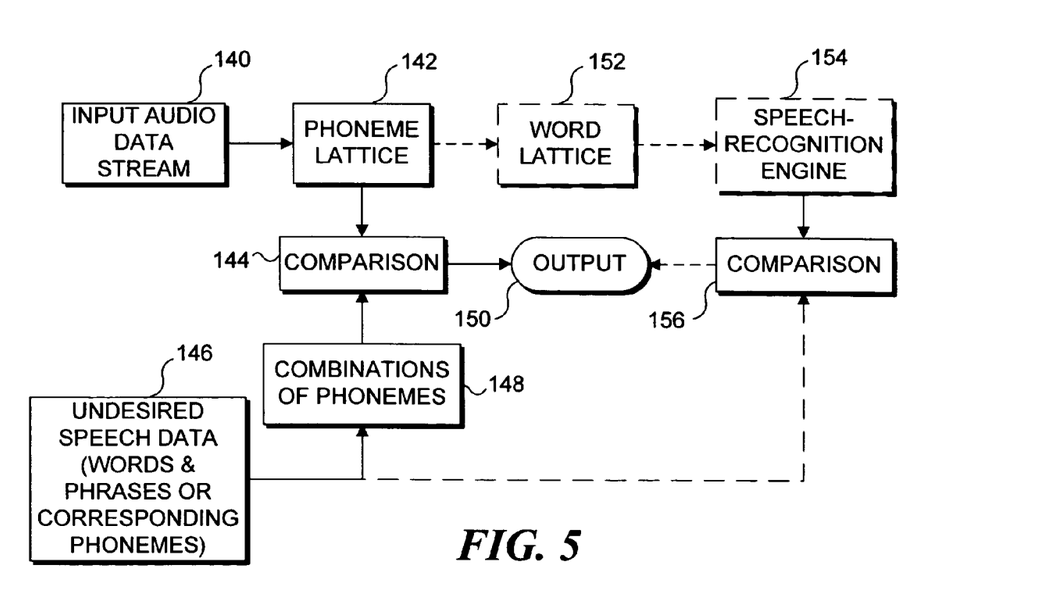
FIG. 5 is a functional block diagram illustrating details for comparing audio data with undesired speech to identify any portions of the audio data that should be altered to produce the censored audio data.

FIG. 5 graphically illustrates both of the approaches used in FIGS. 3 and 4. Input audio data stream 140, which comprises speech, is processed to form a phoneme lattice 142. Undesired speech data (words and phrases, or corresponding phonemes) 146 are processed (or simply input) to provide combinations of phonemes 148 corresponding to each of the undesired words and phrases in the target data. The combinations of phonemes 148 are compared to the phonemes in phoneme lattice 142, in a block 144. An output 150 is produced as a result of the comparison, indicating any combination of phonemes in the input audio data stream that corresponding to the combination of phonemes comprising the undesired speech.

Alternatively, phoneme lattice 142 is used to produce a word lattice 152. Based upon the probabilities associated with each word in the word lattice, and with N-grams formed therefrom, a speech recognition engine 154 selects the most probable words and phrases in the input audio data stream comprising speech for comparison with the undesired words and phrases in the target data.

Figure 5A:
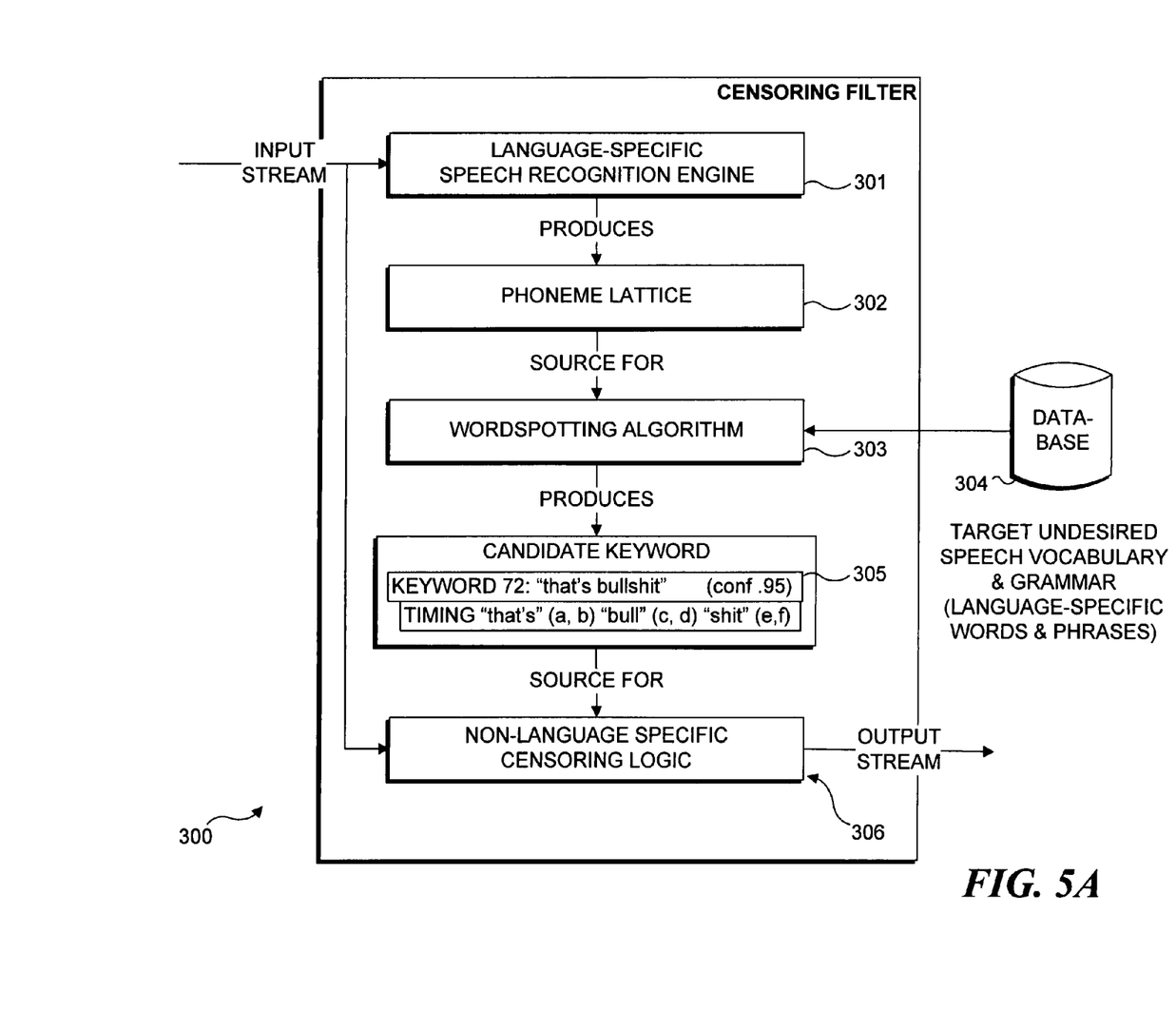
FIG. 5A is a logic diagram providing details of an exemplary censoring filter used in the present invention to process an input stream, to yield a filtered output stream.

FIG. 5A shows details of an exemplary implementation of a censoring filter 300, from an input stream to an output stream. The censoring filter takes the input stream and passes it through a language-dependent speech recognizer 301. The recognizer produces a phoneme lattice 302 representing a continuous utterance stream. Phoneme lattice 302 contains the time codes and probabilities of each phoneme and is passed into a wordspotting algorithm 303, which has access to a database 304 of keywords for which to look. As noted above, these keywords can be single words or phrases. Wordspotting algorithm 303 passes a best candidate keyword 305 (if any is identified) to a non-language specific censoring logic 306. The best candidate keyword contains information from database 304, including the keyword id, or the keyword and an action to take (not shown). Best candidate keyword 305 also contains dynamic information, such as the score and time codes for the beginning and ending of each sub phrase (as shown) and each phoneme (not shown). Based on the score of best candidate keyword 305, non-language specific censoring logic 306 can determine whether to take action or not, depending upon whether the score is above a dynamic threshold. If the score is not above the dynamic threshold, the audio from the input stream is passed straight through to the output stream. However, if the score requires an action, censoring logic 306 looks at the predefined action (not shown) for best candidate keyword 305.

Figure 6:
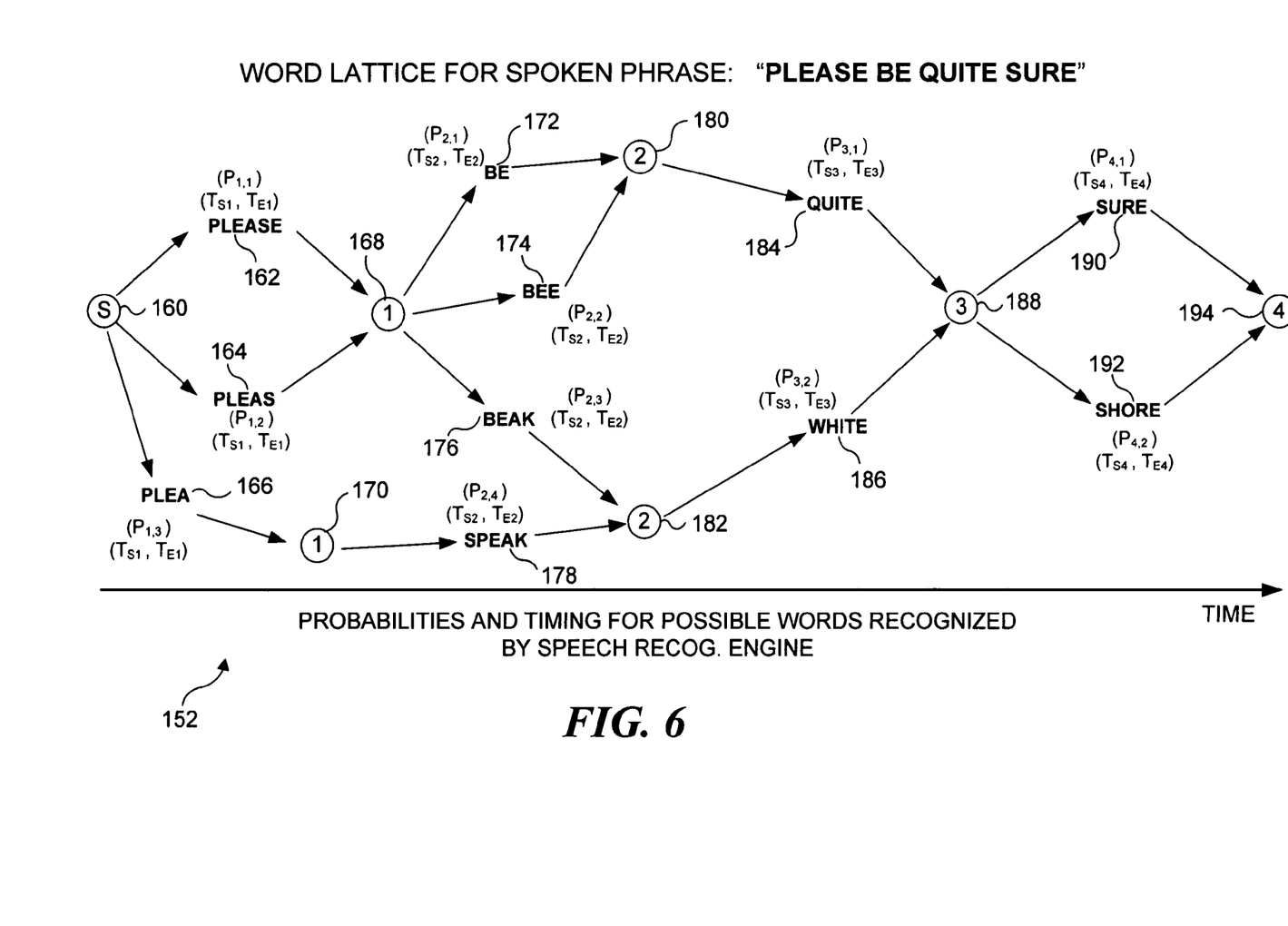
FIG. 6 illustrates a simple example of a word lattice, showing the probability and time interval associated with each node.

As indicated above, a word lattice is generated based upon a phoneme lattice that was determined for the input audio data stream. To simplify the figures, no attempt is made to illustrate the phoneme lattice. However, FIG. 6 illustrates an exemplary word lattice 152 that is derived from the phoneme lattice (not shown) produced for the spoken phrase, "please be quite sure." Word lattice 152 begins at a node 160. Different likely possibilities for the first word of the phrase that was spoken in the input audio data stream are indicated, along with the probability of each possible word, and the start time and end time for the word.

A first possible initial word 162 ("please") has a probability $P_{1,1}$, a second possible initial word 164 ("pleas") has a probability $P_{1,2}$, and a third possible initial word 166 ("plea") has a probability $P_{1,3}$. The first two possible initial words connect to a node 168, while the third possible initial word connects to a node 170. Each possible initial word in the spoken phrase has a start time $T_{S1}$ and an end time $T_{E1}$ associated with it. Node 168 branches to three possible second words 172, 174, and 176 for the phrase, including "be," "bee," and "beak," each of which are associated with probabilities $P_{2,1}$, $P_{2,2}$, and $P_{2,3}$, respectively, while a fourth possible second word 178 ("speak") is associated with a probability $P_{2,4}$. Possible second words 172 and 174 are coupled to a node 180, while the other two possible second words 176 and 178 are couple to a node 182.

Possible third words 184 and 186 are "quite" and "white," with probabilities $P_{3,1}$ and $P_{3,2}$; these two words respectively couple nodes 180 and 182 to a node 188. Two possible fourth words in the phrase 190 and 192 are "sure" and "shore," and these two words are respectively associated with the probabilities $P_{4,1}$ and $P_{4,2}$ and couple node 188 to a node 194. While not shown, each sequence of words in the lattice also has a probability associated with it, indicating the likelihood that the words spoken correspond to the phrase represented by that sequence.

Once the lattice of words spoken is generated for the input audio data comprising speech, the most probable sequence of words is identified. The words/phrases comprising the most probable sequence are then compared against words/phrases found within the target undesired speech data to determine if the speech should be altered. Any undesired words or phrases that were thus identified as likely being included therein are altered in some predefined manner that prevents the words in the resulting censored speech from either being heard or being intelligible.

Speech recognition can only identify a most likely sequence of words in input audio data, based upon probabilities, and the determination is not absolutely accurate. Accordingly, in making the comparison between words/phrases that seem most likely included in the input audio data stream being processed, the present invention makes a decision about whether a word/phrase matches a corresponding word/phrase that is included in the target undesired speech data, based upon a probability threshold that is associated with each undesired word or phrase included in the target data. If the probability of a word likely included in the input audio data is greater than the probability threshold for the corresponding word in the undesired speech data, the word is selected for alteration, producing the censored output audio data stream.

It will be apparent that different probability thresholds can be assigned to different undesired words or phrases, depending upon how objectionable the word or phrase is considered. Thus, an objectionable slang word might have a substantially higher probability threshold associated with it, compared to a word or phrase viewed as a sexual profanity. Although words or phrases with a relatively lower probability threshold may be incorrectly identified as being present in the input audio data stream or speech that is being processed, it is generally preferable to incorrectly identify words or phrases viewed as very objectionable when producing censored speech, rather than failing to identify and alter such words or phrases so that they are allowed to be heard by an audience. Similarly, words and phrases that are not very objectionable may not be properly identified because of their higher probability threshold and may therefore remain in the censored speech unaltered, without causing too much concern.

In the embodiment of FIG. 4, a comparison of phonemes from the audio input data stream being processed, with phonemes comprising undesired speech is made to identify phonemes comprising undesired speech. A probability threshold is also employed in this embodiment to identify any undesired words or phrases (based on the phonemes comprising such words or phrases) that are likely included in the speech being processed. Each combination of phonemes in the input audio data having a probability greater than the probability threshold associated with a corresponding combination of phonemes in the undesired speech data, is thus designated as undesired speech and is either altered or deleted to avoid the undesired speech from being heard by an audience. The phoneme lattice also includes start and end times for each phoneme. The start and end times used in the word lattice and in the phoneme lattice enable specific words/phrases to be altered in the speech being processed to produce the censored speech. For example, the speech being processed may include an undesired phrase comprising two or more words. By deleting or making a specific one of the words comprising the phrase either inaudible or unintelligible, the remaining words in the phrase can still be included in the censored speech without giving rise to any concern.

The content of the target undesired speech data that are employed when processing speech to identify undesired words or phrases can be specifically tailored as a function of the audience that will hear the censored speech and based on other factors. For example, undesired speech data applied in automatically censoring speech produced during a panel discussion would likely include only words or phrases viewed as very objectionable, if the censored speech is intended to be broadcast during a late-night radio or television show that will likely not be heard by very young children. For such an audience, the target undesired speech data employed might comprise a subset of the target undesired speech data used for producing censored speech to be broadcast over network television on a Saturday morning, when younger children are much more likely to hear the censored speech.

Besides the audience that will likely hear the censored speech, and the time of day in which it will be made available to an audience, the identity of the person uttering the speech being censored also may be considered in choosing the probability threshold and/or the contents of the undesired speech data. For example, a political figure being interviewed should be considered responsible for the choice of words that the person speaks, and as a result, only the most objectionable undesired speech would likely be included in the targeted data that is compared against the speech being processed from that speaker to produce the censored speech. In contrast, a rap vocalist who is being interviewed might be considered more likely to speak using very undesired words or phrases, so that either (or both) the probability threshold is reduced or a more complete set of target undesired speech data should be applied in producing the censored speech.

It is also contemplated that the probability threshold applied in processing speech can be dynamically varied as a function of the frequency with which undesired speech is detected. Initially, a relatively higher probability threshold would likely be applied. However, using a Poisson distribution for the undesired speech detected, the probability threshold can be changed as the frequency of undesired speech identified increases beyond specific predefined levels. By reducing the probability threshold, it is likely that more undesired speech included in the speech being processed will be detected and therefore not allowed to be included in the censored speech. However, again, it is more likely that words or phrases will be misidentified as undesired speech as the probability threshold is reduced. By using a Poisson distribution to dynamically vary the probability threshold, it is less likely that the probability threshold will be set too low based upon a cluster of undesired words or phrases being detected in the speech, and more likely that it will be adjusted upwardly as the frequency with which undesired speech is detected, is reduced.

The goal of automatically processing speech with a censor filter is to avoid undesired speech from either being heard or being intelligible to an audience that hears the censored speech. This goal can be accomplished by altering the speech in several different ways. An undesired word or phrase can simply be deleted from the speech being processed, or can be overwritten either with a sound the masks the undesired speech or with an acceptable word that generally corresponds to the undesired speech. Overriding undesired speech is conventionally done by human sensors who push a button based upon the timing of the undesired speech so that the objectionable word or phrase is "bleeped." While the present invention can also "bleep" an undesired word or phrase, in some applications, a more preferable approach is to create an acceptable word that overwrites or replaces the objectionable word. The acceptable word is created using previously uttered phonemes of the speaker that can be combined to produce the acceptable word, so that it sounds just as if it were spoken by the speaker whose speech is being censored. The start and end times for the unacceptable word or phrase that is being overwritten are used to ensure that the replacement acceptable word or phrase is inserted into the speech being processed at the appropriate times and has the appropriate duration.

Figure 7:
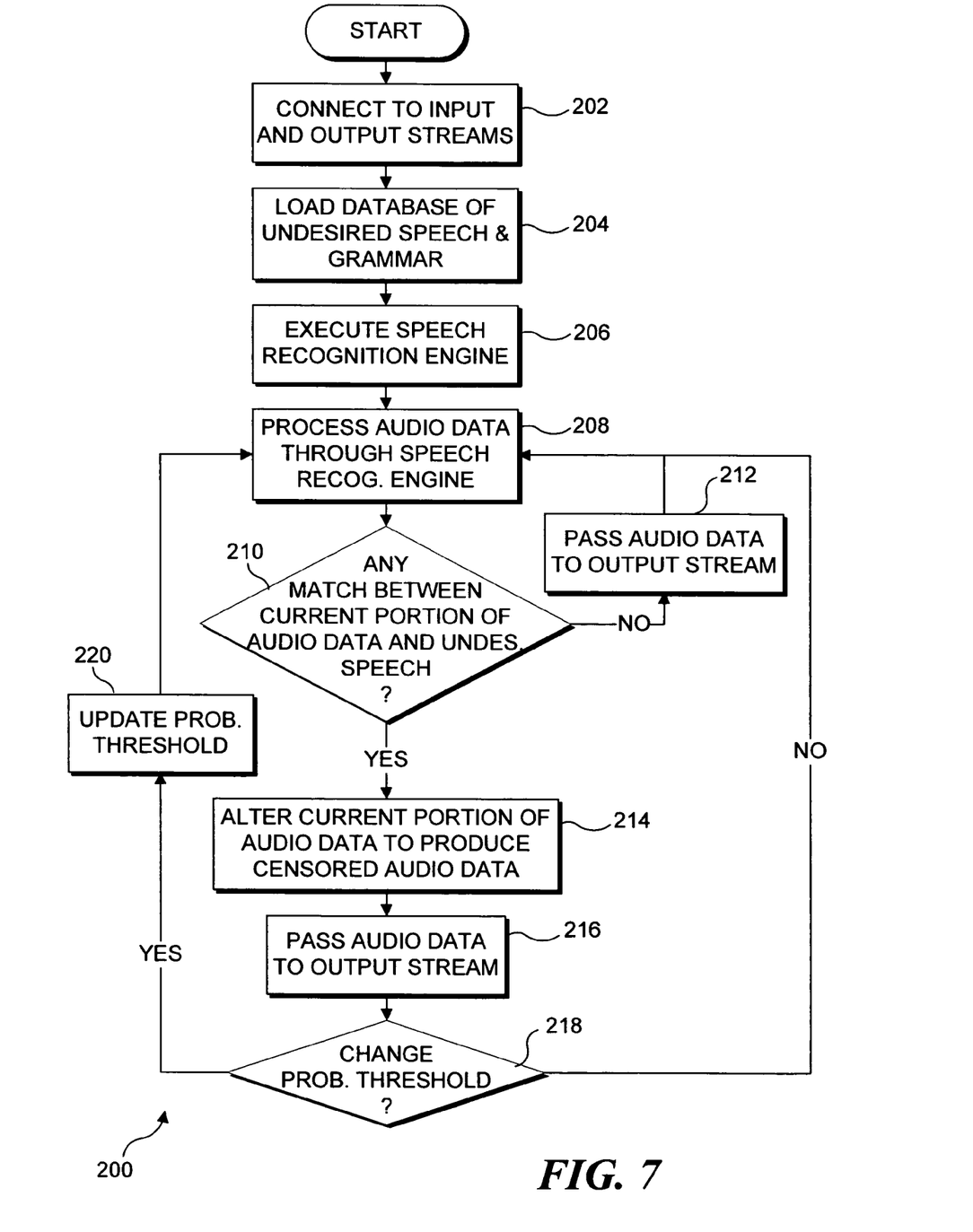
FIG. 7 is an overview flowchart showing the logical steps implemented in an embodiment of the present invention.

A flowchart 200 in FIG. 7 illustrates the logical steps implemented in carrying out an embodiment of the present invention. The process begins with a step 202, which provides for connecting input and output streams to the automatic censoring filter. Details of two different embodiments of the automatic censoring filter were discussed above. A step 204 loads a database that includes the target undesired speech and grammar for use by the automatic censoring filter. In addition, the step will also typically provide for loading the policies that will be applied in censoring speech and the triggering probability thresholds and rules for censoring speech that will be used by the logic in processing the input audio data stream. The censoring policies can indicate the kind of alteration that will be applied if an undesired word or phrase is detected in the input speech.

A step 206 executes the speech recognition engine (if it is used for recognizing and comparing language-specific words that are detected in the input speech with undesired words and phrases in the target undesired speech data). Alternatively, the non-language specific censoring logic for comparing phonemes and the phoneme logic shown in FIG. 4 can be loaded for comparing the phonemes comprising words or phrases in the target undesired speech against phonemes in the input speech. Next, a step 208 provides for processing the input audio data stream either using the speech recognition engine, or using the phoneme comparison logic, as discussed above.

A decision step 210 determines if there is any match between a current portion of the input speech and the undesired speech. If not, a step 212 provides for passing the input speech unaltered to the output stream. The next portion of the input audio data stream is then processed in step 208, as indicated above. Conversely, if a match is detected between a current portion of the input audio data and a word or phrase in the undesired speech data, a step 214 alters the current portion of the audio data to produce censored speech. Next, a step 216 passes the audio data (either altered or in its original form) to the output stream from the automatic censoring filter.

A decision step 218 determines if there is any change in the probability threshold that is to next be applied in decision step 210, for example, based upon the frequency with which undesired speech has been detected in the audio data currently being processed. If so, a step 220 updates the probability threshold. As explained above, changes in the probability threshold are preferably determined based upon the Poisson distribution of undesired speech detected in the input audio data stream. Following step 220, the logic continues with step 208, processing the next portion of the input audio data stream. If a change in the probability threshold is not required, the logic proceeds from decision step 218 to step 208.

Figure 8:
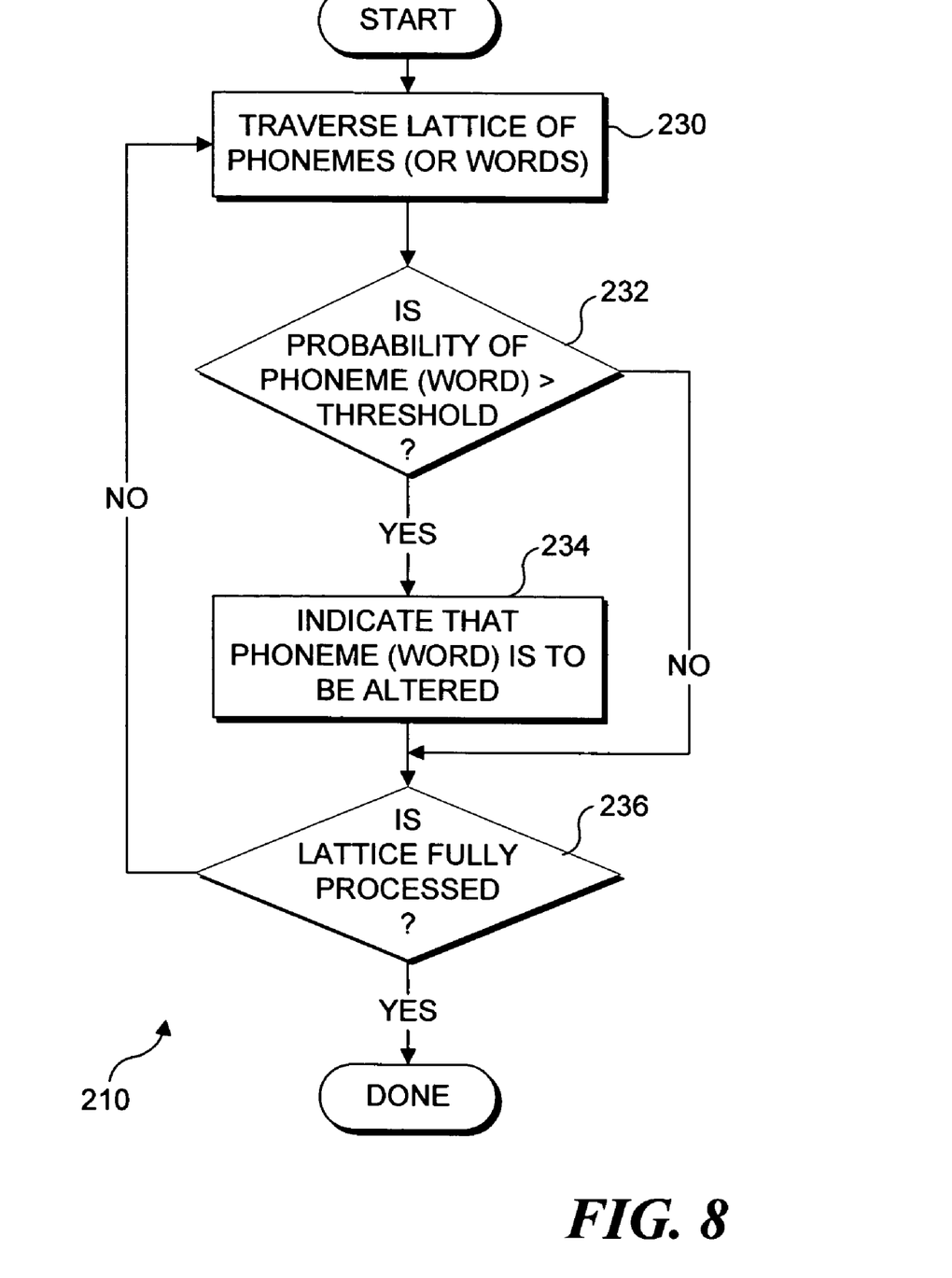
FIG. 8 is a flowchart illustrating the logical steps carried out in traversing a lattice (phoneme or word) to identify portions of the audio data that are included in the undesired speech.

Details of decision step 210 are illustrated in FIG. 8. A step 230 indicates that the logic traverses the lattice of phonemes (or words) that has been formed from the input audio data stream being processed. A decision step 232 determines if the probability of each phoneme (word) that was identified in the input audio data stream as corresponding to a phoneme (word) in the target undesired speech is greater than the probability threshold associated with that undesired phoneme (word) in the target undesired speech data. If so, a step 234 indicates that the phoneme (word) is to be altered. Conversely, a negative determination in decision step 232 bypasses step 234 and proceeds with a decision step 236. After step 234 or in response to a negative determination in decision step 232, decision step 236 determines if the lattice of phonemes (or words) has been fully processed. If not, the logic returns to step 230 to continue traversing the lattice. Otherwise, this portion of the logic is completed.

Figure 9:
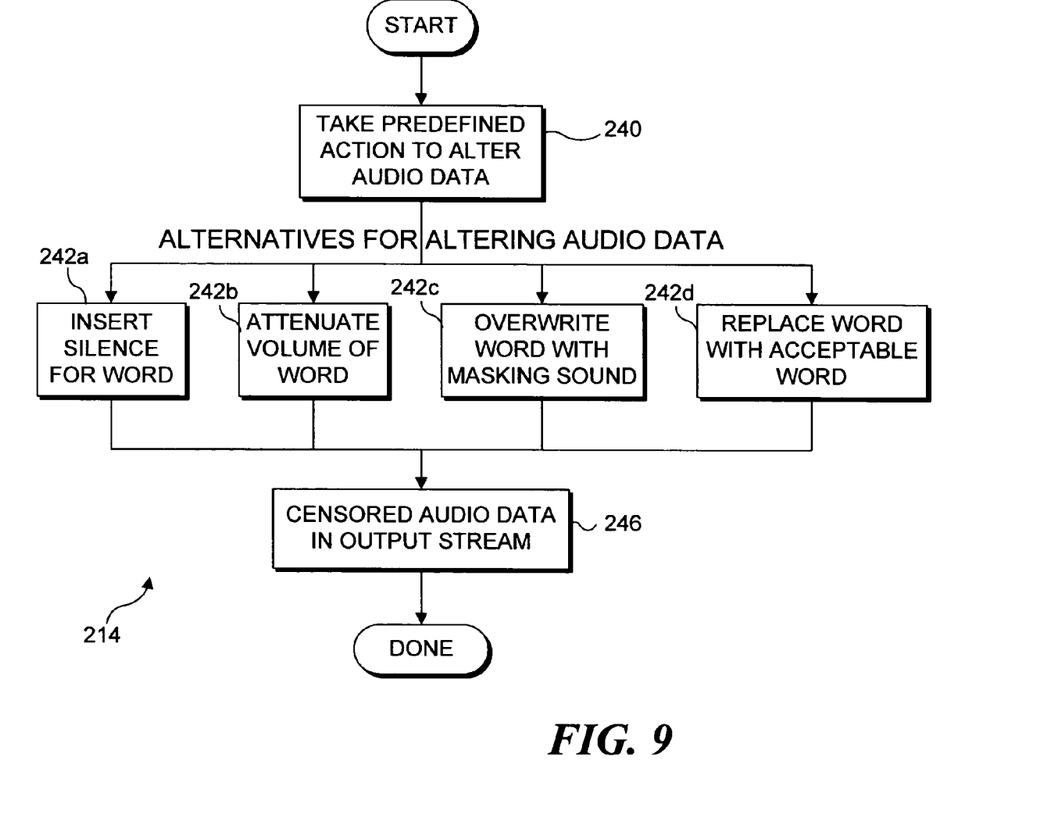
FIG. 9 is a flowchart illustrating the logical steps for altering the audio data to produce censored audio data and indicating four alternative approaches than can be employed.

In FIG. 9, details of step 214 are illustrated. A step 240 indicates that a predefined action is taken to alter speech in the input audio data stream that has been identified as corresponding to a phoneme (or word) in the target undesired speech data, and with a probability greater than the probability threshold. Four different alternatives are provided for altering the audio data as indicated in this Figure. It will be understood that only one of these alternatives is applied to alter the input audio data stream to produce the censored speech was output from the automatic censoring filter. A step 242a indicates a first alternative, which simply inserts an interval of silence to replace a word that is identified as corresponding to an undesired word in the target undesired speech data. Again, the start time and end time for that word determines where the period of silence is inserted into the audio data stream to produce the censored speech in which the detected undesired word is eliminated.

As a second alternative, a step 242b provides for attenuating the volume of the undesired word substantially below that of all of the acceptable speech in the input audio data stream, so that the undesired word will not be heard by an audience listening to the censored audio data. The start time and end time for the undesired word determine the timing and interval in the output censored speech during which the volume is substantially attenuated to make the undesired word inaudible.

In a step 242c, a third alternative provides for overwriting the undesired word with a masking sound, i.e., "bleeping" the undesired word with a tone. The volume of the tone is set sufficiently loud so that the undesired word in the input audio data stream cannot be understood in the censored speech.

The fourth alternative, which is indicated in a step 242d, replaces the undesired word with an acceptable word that is derived using phonemes in the speech previously uttered by the speaker. As noted above, the start time and end time of the undesired word or phrase is taken into account when replacing the undesired word or phrase with an acceptable word or phrase.

It will be understood that in each of the four alternatives discussed above for automatically altering input speech to produce censored speech, the alteration can be applied either to a single word or to a plurality of words (i.e., a phrase) detected in the input speech and which corresponds to an undesired word or phrase that is included within the target undesired speech data. The policy chosen by the entity responsible for providing automatically censored speech data will determine which of these four alternatives for altering the input audio data stream will be applied. The best choice of the four alternatives may depend upon the nature of the input audio data stream that is being censored. For example, the audio chat during a video game or the words of a song lyric that are being broadcast might best be altered by removing the offending words (the alternative of step 242a) or by attenuating the offending words (the alternative of step 242b) so that the censoring does not upset the experience of the audience listening to the censored audio data. In contrast, it might be better to overwrite undesired speech (i.e., bleep the offending words) in the audio input data stream for a live interview (the alternative of step 242c), to make it clear that the person speaking uttered an expletive, which should not be broadcast to an audience. The sound track of a movie can be altered using the alternative of step 242d, to replace offensive and undesired words with corresponding acceptable words. Thus, for example, the words "God" and "damn" might be replaced with the words "gosh" and "darn," using the phonemes from the previous speech by the speaker, producing the censored phrase "gosh darn it."

It is also contemplated that the alternative applied for altering the audio data input stream can be dynamically selected depending upon varying circumstances in the input audio data stream, such as the frequency with which undesired words or phrases are being detected, and other relevant factors. For example, if a substantial portion of the input audio data stream is identified as corresponding to undesired speech, bleeping each word or phrase so that the offending word or phrase is unintelligible can produce an annoying censored output audio data stream. Accordingly, after the frequency of undesired speech detected reaches a certain level, instead of bleeping an undesired word, it may be replaced with either silence, or substantially attenuated so as to be inaudible.

It should be noted that the process of censoring speech can be applied either at a central location, before the censored audio data are transmitted to an audience, or alternatively, can be carried out on a computing device that is employed to receive the audio data stream, before the input audio data stream is heard by one or more users comprising the audience. However, it will generally be preferable to carry out the automatic censoring filter process either in real-time or in a batch mode using a central computing device that produces the censored output audio data stream prior to it being transmitted or distributed to and heard by an audience. It is therefore likely that only in an application such as censoring speech in a peer-to-peer chat session, will this invention be applied locally to automatically censor speech by the participants in the chat session. The censoring filter can then be applied either on the computing device used by the speaker, or on a computing device used by the listener.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for automatically censoring audio data, comprising the steps of:
   (a) automatically processing the audio data to detect any undesired speech that may be included therein, by comparison to undesired speech data, by performing the following steps;
   comparing words in the audio data against words comprising the undesired speech, to identify potential matches;
   dynamically varying a probability threshold dependent upon at least one criterion; and
   based upon a probability of a potential match and the probability threshold, determining whether any undesired speech is included in the audio data;
   (b) for each occurrence of undesired speech that is automatically detected, altering the undesired speech detected in the audio data, producing censored audio data in which the undesired speech is substantially no longer perceivable by a listening audience; and
   (c) dynamically adjusting the probability threshold based upon a frequency with which undesired speech by a specific speaker is detected in the audio data, so that as the occurrences of undesired speech that are detected increase, the probability threshold is reduced.

2. The method of claim 1, wherein the at least one criterion includes at least one of:
   (a) an expected audience for the audio data;
   (b) an identity of a speaker that uttered the audio data;
   (c) a time at which the audio data will be heard by an audience;
   (d) a type of event resulting in the audio data;
   (e) an application of the audio data; and
   (f) a frequency with which undesired speech by a specific speaker has previously been detected in the audio data.

3. The method of claim 1, wherein the step of altering comprises one of the steps of:
   (a) substantially reducing a volume of any portions of the audio data that match the undesired speech so that the portions are substantially inaudible;
   (b) deleting any portions of the audio data that match the undesired speech;
   (c) overwriting any portions of the audio data that match the undesired speech with an obscuring audio signal that prevents the undesired speech from being intelligible; and
   (d) replacing any portions of the audio data that match the undesired speech with related speech that is acceptable and is not included in the undesired speech, the related speech being produced using phonemes that were previously uttered by a speaker whose speech is being replaced.

4. The method of claim 1, further comprising the step of setting different probability thresholds for specific words or phrases included in the undesired speech, so that more objectionable words or phrases have a lower probability threshold than less objectionable words or phrases.

5. A memory medium on which are stored machine executable instructions for carrying out the steps of claim 1.

6. A method for automatically censoring audio data to prevent undesired speech included therein from being understandable by an audience who may be listening to the audio data, comprising the steps of:
   (a) accessing grammar data and undesired speech data that are in a desired format selected to be usable for comparison to the audio data;
   (b) processing the audio data to produce processed audio data that is in the desired format by performing the following steps;
   generating a lattice of phonemes comprising word fragments that are likely included in the audio data;
   comparing the word fragments against corresponding word fragments that are included in the undesired speech data, to identify potential matches;
   dynamically varying a probability threshold dependent upon at least one criterion; and
   based upon a probability of a potential match and the probability threshold, determining whether any undesired speech is included in the audio data;
   (c) if portions of the processed audio data are found to match any undesired speech, altering the audio data to produce censored audio data in which each occurrence of undesired speech is made incapable of being understood by the audience, else if none of the audio data is found to match any undesired speech, the audio data are not so altered; and
   (d) dynamically adjusting the probability threshold based upon a frequency with which undesired speech by a specific speaker is detected in the audio data, so that as the occurrences of undesired speech that are detected increase, the probability threshold is reduced.

7. The method of claim 6, wherein the desired format comprises phonemes and wherein the lattice of phonemes comprises one or more nodes, each node having associated therewith a time interval for the node and a probability that the phoneme is included in the audio data, and wherein the step of processing comprises the step of using the probability associated with node and the time interval to determine an overall probability indicating the likelihood that the phonemes are actually included in the audio data.

8. The method of claim 7, wherein the step of comparing comprises the step of applying a probability threshold to determine if phonemes included in the lattice of phonemes likely match corresponding phonemes in the undesired speech data so as to indicate that the audio data includes undesired speech corresponding to the phonemes.

9. The method of claim 6, wherein the step of altering the audio data comprises one of the steps of:
- (a) substantially reducing a volume of any portions of the audio data that match the undesired speech so that the portions are not audible;
- (b) deleting any portions of the audio data that match the undesired speech;
- (c) overwriting any portions of the audio data that match the undesired speech with an obscuring audio signal that prevents the undesired speech from being intelligible; and
- (d) replacing any portions of the audio data that match the undesired speech with related speech that is acceptable and is not included in the undesired speech, using phonemes that were previously uttered by a speaker whose speech is being replaced.

10. The method of claim 6, wherein the step of automatically comparing applies a dynamically variable probabilistic determination, wherein a probability threshold for determining that a portion of the audio data matches undesired speech is determined based upon at least one criterion relating to the audio data.

11. The method of claim 10, wherein the at least one criterion includes at least one of:
- (a) an expected audience for the audio data;
- (b) an identity of a speaker that uttered the audio data;
- (c) a time at which the audio data will be heard by an audience;
- (d) a type of event resulting in the audio data;
- (e) an application of the audio data; and
- (f) a frequency with which undesired speech by a specific speaker has previously been detected in the audio data.

12. The method of claim 10, further comprising the step of setting different probability thresholds for specific words or phrases included in the undesired speech data, so that more objectionable words or phrases have a lower probability threshold than less objectionable words or phrases.

13. The method of claim 6, wherein the step of processing the audio data is carried out using a speech recognition engine.

14. The method of claim 6, wherein the audio data are processed in one of:
- (a) a batch mode wherein the audio data are processed offline; and
- (b) a real-time mode wherein the audio data are processed as produced and just before being heard by an audience.

15. A memory medium on which machine readable instructions are stored for carrying out the steps of claim 6.

16. A system for automatically censoring audio data to prevent undesired speech included therein from being understandable by an audience who may be listening to the audio data, comprising:
- (a) a memory in which the undesired speech data and machine instructions are stored and which at least temporarily stores the audio data;
- (b) a processor that is coupled to the memory and able to access the audio data at least temporarily stored therein, the processor executing the machine instructions, causing the processor to carry out a plurality of functions, including:
  - (i) automatically processing the audio data to detect any undesired speech that may be included therein by performing the following steps;
  - generating a lattice of phonemes comprising word fragments that are likely included in the audio data;
  - comparing the word fragments against corresponding word fragments that are included in the undesired speech data, to identify potential matches;
  - dynamically varying a probability threshold dependent upon at least one criterion; and
  - based upon a probability of a potential match and the probability threshold, determining whether any undesired speech is included in the audio data;
  - (ii) for each occurrence of undesired speech that is automatically detected, altering the occurrence in the audio data, producing censored audio data in which the undesired speech is substantially no longer perceivable by a listening audience; and
  - (iii) dynamically adjusting the probability threshold based upon a frequency with which undesired speech by a specific speaker is detected in the audio data, so that as the occurrences of undesired speech that are detected increase, the probability threshold is reduced.

17. The system of claim 16, wherein the at least one criterion includes at least one of:
- (a) an expected audience for the audio data;
- (b) an identity of a speaker that uttered the audio data;
- (c) a time at which the audio data will be heard by an audience;
- (d) a type of event resulting in the audio data;
- (e) an application of the audio data; and
- (f) a frequency with which undesired speech by a specific speaker has previously been detected in the audio data.

18. The system of claim 16, wherein the machine instructions cause the processor to alter the audio by doing at least one of:
- (a) substantially reducing a volume of any portions of the audio data that match the undesired speech so that the portions are substantially inaudible;
- (b) deleting any portions of the audio data that match the undesired speech;
- (c) overwriting any portions of the audio data that match the undesired speech with an obscuring audio signal that prevents the undesired speech from being intelligible; and
- (d) replacing any portions of the audio data that match the undesired speech with related speech that is acceptable and is not included in the undesired speech, the related speech being produced using phonemes that were previously uttered by a speaker whose speech is being replaced.

19. A system for automatically censoring audio data to prevent undesired speech included therein from being understandable by an audience who may be listening to the audio data, comprising:
- (a) a memory in which the undesired speech data and machine instructions are stored and which at least temporarily stores the audio data;
- (b) a processor that is coupled to the memory and able to access the audio data at least temporarily stored therein, the processor executing the machine instructions, causing the processor to carry out a plurality of functions, including:
  - (i) automatically processing the audio data to detect any undesired speech that may be included therein by performing the following steps;
  - comparing words in the audio data against words comprising the undesired speech, to identify potential matches;
  - dynamically varying a probability threshold dependent upon at least one criterion; and based upon a probability of a potential match and the probability threshold, determining whether any undesired speech is included in the audio data;

(ii) for each occurrence of undesired speech that is automatically detected, altering the undesired speech detected in the audio data, producing censored audio data in which the undesired speech is substantially no longer perceivable by a listening audience; and (iii) dynamically adjusting the probability threshold based upon a frequency with which undesired speech by a specific speaker is detected in the audio data, so that as the occurrences of undesired speech that are detected increase, the probability threshold is reduced.

* * * * *